April 19, 1960 W. C. YOCUM 2,933,060

FLOW INDICATOR

Filed Sept. 24, 1956

INVENTOR.
WILLIAM C. YOCUM.
BY

ATTORNEYS.

United States Patent Office 2,933,060
Patented Apr. 19, 1960

2,933,060

FLOW INDICATOR

William C. Yocum, Scott Township, Allegheny County, Pa., assignor to Superior Valve and Fittings Company, Pittsburgh, Pa., a corporation of Pennsylvania Application September 24, 1956, Serial No. 611,664

2 Claims. (Cl. 116—117)

This invention is for a flow indicator for use in pipe lines carrying liquids, and is especially designed for use in refrigeration systems where devices of this kind are used in lines carrying liquid refrigerant, but it is also applicable for use in systems where other liquids are circulated.

In refrigerator systems, pipes of relatively soft metal are widely used and they are of relatively small diameter. The joints in such pipes, however, must be tight in order to prevent loss of refrigerant or the leakage of air into the system. Flow indicators for use in such systems must therefore be relatively small, but they must be of such construction that the threaded connections at each end can be tightly made up with wrenches without being damaged by the twisting torque to which they are subjected. Moreover, the liquid is of a character which is difficult to see and this is especially true where the flow indicator is in a poorly lighted or inaccessible place, a condition which is often encountered.

Flow indicators of this type usually have a glass tube carried between threaded metal terminals with gaskets being employed between the tube ends and the terminals. The terminals are usually connected by a tubular metal shell to protect the glass, this shell having windows through which the tube may be viewed. Such devices are easily broken when dropped, the glass may be twisted and broken when wrenches are used to make or break the connections due to the metal being too weak to resist the twisting torque, and leakage eventually occurs at the gasket.

The present invention has for its object to provide a flow indicator having a solid one-piece body which may be forged with diametrically opposed transparent windows fused directly to the metal, thereby eliminating all gaskets and providing an arrangement through which all twisting torque is transmitted through an integral metal body. A further object of my invention is to form at least one of the glass windows with a contour that so changes the light refraction as to provide easy detection of the presence or absence of liquid in the indicator.

These and other objects and advantages are secured by my invention which may be more fully understood by reference to the accompanying drawings in which.

Figure 1:
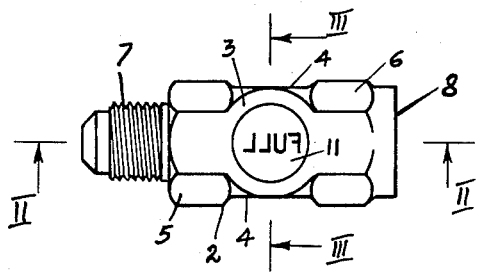
Fig. 1 is a plan view of an indicator embodying my invention.
Figure 2:
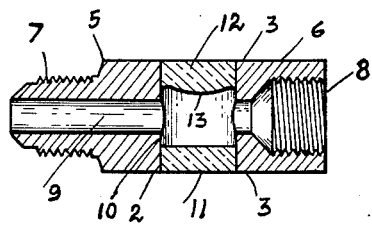
Fig. 2 is a longitudinal section in the plane of line II—II of Fig. 1.
Figure 3:
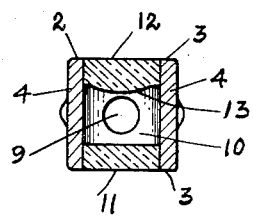
Fig. 3 is a transverse section in the plane of line III—III of Fig. 2.
Figure 4:
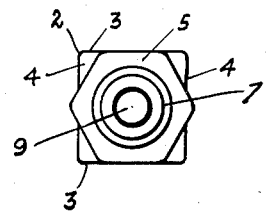
Fig. 4 is an end view of the indicator.

In the drawings, the indicator shown is a one-piece forged metal body having a mid portion 2 of substantially square section, two opposite flat side faces being designated 3, and the other two flat side faces being designated 4. At each end of the mid portion is a wrench-engaging portion, preferably of hexagonal contour, these portions being designated 5 and 6. Projecting beyond the portion 5 there is a connector 7 which is here shown in the form of a threaded nipple, and at the other end is a connector 8, shown as an internally threaded connector portion.

There is a longitudinal passage 9 through the body and a hole 10 of uniform diameter is formed through the body from one flat surface 3 to the other. Into one end of the hole 10 there is fused a glass disk 11, the exposed face of which is flush with the flat face of the body. Into the other end of the hole is fused a second glass disk 12 having its exposed face flush with the surface of the body. The glass which is employed is heavy enough to withstand the pressure and resist breakage if the fitting is dropped. Its formula is adjusted so that, although fused to the metal, it is not affected by thermal expansion or contraction of the body. I use a glass prepared by the Corning Glass Company at Corning, New York, for the purpose.

The disk 11 has an indicia, such as the word "Full" printed on its surface in reverse. The disk 12 is of non-uniform thickness, having lens or other surfaces 13 on its inner face which refract the light transmitted through it from the opposite window in such manner as to make this indicia invisible if there is no fluid in the coupling. However, when the coupling is full of transparent liquid, the refraction is uniform and the indicia, such as the word "Full" is clearly and plainly visible. Because the windows 11 and 12 are the full diameter of the hole 10 they are of adequate area and transmit ample light even though the unit is of relatively small dimension. Because the glass is flush with the metal face in which it is located, it is easily wiped clean and kept free of dust accumulation.

The device as thus constructed is sturdy, rugged, and without gaskets, plastic seals or other source of leakage or failure. It avoids many of the difficulties encountered in soldering in mounting rings for the glass as disclosed in the Moore and Hornung Patent No. 2,744,487, granted May 8, 1956, owned by my assignee and with which I am familiar.

I claim:

1. A visual flow indicator comprising an elongated forged body having an intermediate portion of square cross section and having an integral portion of hexagonal cross section at each end, the distance diametrically across the hexagonal end portions from one flat face to the other being the same as the distance across the square intermediate section, a pipe connector at each end of the body, the intermediate portion of the body of square section having an axial opening of uniform diameter therethrough and having a transverse opening of uniform diameter therethrough which transverse opening intersects the passageway, the diameter of the transverse opening being larger than the diameter of the axial opening, and a glass disk at each end of the transverse opening having its outer face flush with the surface in which it is set and having its periphery fused and hermetically sealed to the metal around the opening.

2. A visual flow indicator of the class described comprising an integral forged metal body having a central portion of square section providing four flat faces thereabout and an end portion at each end of hexagonal contour, a pipe connection at each end of the body, the body having a passageway extending axially from one end to the other and having an opening extending transversely through the central portion from one flat face to the opposite one through which light may be transmitted, the opening intersecting the passageway, and a transparent disk in each end of the opening at opposite faces of the body, one disk having indicia thereon and the other disk having its inner surface lenticularly curved so that the disk has a non-uniform thickness to vary the refraction of light therethrough and which is complemented by liquid in the body when in use to vary the light-transmitting qualities of the disk so that the visibility of the indicia is altered by the presence or absence of liquid in the body, said indicia being visible by the transmission of light through both of said transparent disks.

References Cited in the file of this patent

UNITED STATES PATENTS

| | | |
|---|---|---|
| 470,858 | Klinger | Mar. 15, 1892 |
| 1,507,926 | Mendenhall | Sept. 9, 1924 |
| 2,554,557 | Brown | May 29, 1951 |
| 2,600,148 | Wittlin | June 10, 1952 |
| 2,655,124 | Gary | Oct. 13, 1953 |
| 2,744,487 | Moore | May 8, 1956 |
| 2,811,128 | Franck | Oct. 29, 1957 |
| 2,843,078 | Wittlin | July 15, 1958 |